(12) United States Patent
Zhao et al.

(10) Patent No.: US 12,166,728 B2
(45) Date of Patent: Dec. 10, 2024

(54) TIME-DOMAIN RESOURCE DETERMINATION METHOD AND APPARATUS, AND TERMINAL DEVICE

(71) Applicant: GUANGDONG OPPO MOBILE TELECOMMUNICATIONS CORP., LTD., Guangdong (CN)

(72) Inventors: Zhenshan Zhao, Dongguan (CN); Yi Ding, Dongguan (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 204 days.

(21) Appl. No.: 17/746,519

(22) Filed: May 17, 2022

(65) Prior Publication Data

US 2022/0286265 A1    Sep. 8, 2022

Related U.S. Application Data

(63) Continuation of application No. PCT/CN2020/083669, filed on Apr. 8, 2020.

(51) Int. Cl.
*H04L 5/14* (2006.01)
*H04L 5/00* (2006.01)
(Continued)

(52) U.S. Cl.
CPC .............. *H04L 5/14* (2013.01); *H04L 5/0048* (2013.01); *H04L 5/0092* (2013.01); *H04W 28/26* (2013.01); *H04W 92/18* (2013.01)

(58) Field of Classification Search
CPC ... H04W 72/0446; H04W 4/46; H04W 92/18; H04W 72/02; H04W 4/40; H04W 72/20; H04L 5/0053; H04L 5/0094
See application file for complete search history.

(56) References Cited

U.S. PATENT DOCUMENTS

2017/0295601 A1* 10/2017 Kim ...................... H04W 72/20
2017/0303291 A1* 10/2017 Chae ..................... H04W 72/12
(Continued)

FOREIGN PATENT DOCUMENTS

CA      3098633 A1    11/2019
CN    105992331 A    10/2016
(Continued)

OTHER PUBLICATIONS

Vivo: "Remaining issues on sidelink synchronization mechanism", 3GPP Draft; R1-2000319, 3GPP TSG RAN WG1 #100, Feb. 24-Mar. 6, 2020. 11 pages.
(Continued)

*Primary Examiner* — Afshawn M Towfighi
(74) *Attorney, Agent, or Firm* — PERKINS COIE LLP

(57) ABSTRACT

Provided are a time-domain resource determination method and apparatus, and a terminal device. The method comprises: a terminal device determining a first slot set within a first period according to a first time division duplexing (TDD) configuration in radio resource control (RRC) signaling or a second TDD configuration in a physical sidelink broadcast channel (PSBCH); and the terminal device selecting some slots from the first slot set according to a first bitmap, wherein the slots constitute time-domain resources in a resource pool.

16 Claims, 5 Drawing Sheets

(51) Int. Cl.
*H04W 28/26* (2009.01)
*H04W 92/18* (2009.01)

(56) References Cited

U.S. PATENT DOCUMENTS

| | | | |
|---|---|---|---|
| 2017/0339679 A1* | 11/2017 | Lee | H04W 72/0446 |
| 2018/0098322 A1* | 4/2018 | Yoon | H04W 56/0005 |
| 2018/0220388 A1 | 8/2018 | Chae et al. | |
| 2019/0020440 A1 | 1/2019 | Santhanam et al. | |
| 2019/0159216 A1* | 5/2019 | Sun | H04W 72/541 |
| 2019/0174491 A1* | 6/2019 | Lu | H04W 72/0446 |
| 2019/0327732 A1* | 10/2019 | Yoon | H04W 72/0446 |
| 2020/0045674 A1* | 2/2020 | Tseng | H04W 76/14 |
| 2020/0154384 A1 | 5/2020 | Chae et al. | |
| 2020/0288471 A1 | 9/2020 | Yoon | |
| 2021/0176720 A1 | 6/2021 | Chae | |

FOREIGN PATENT DOCUMENTS

| | | |
|---|---|---|
| CN | 106464703 A | 2/2017 |
| CN | 107852685 A | 3/2018 |
| CN | 108024338 A | 5/2018 |
| CN | 108076525 A | 5/2018 |
| CN | 108141847 A | 6/2018 |
| CN | 110024459 A | 7/2019 |
| CN | 110351032 A | 10/2019 |
| CN | 110545581 A | 12/2019 |
| CN | 110740434 A | 1/2020 |
| RU | 2713392 C1 | 2/2020 |
| WO | 2019098772 A1 | 5/2019 |
| WO | 2019237236 A1 | 12/2019 |
| WO | 2020006955 A1 | 1/2020 |
| WO | 2020025064 A1 | 2/2020 |

OTHER PUBLICATIONS

Huawei et al: "Remaining details of sidelink synchronization mechanisms", 3GPP Draft; R1-2000185, 3GPP TSG RAN WG1 Meeting #100-e, Feb. 24-Mar. 6, 2020. 14 pages.
Supplementary European Search Report in European application No. 20930193.6, mailed on Oct. 19, 2022. 11 pages.
Written Opinion of the International Search Authority in the international application No. PCT/CN2020/083669, mailed on Dec. 30, 2020. 7 pages with English translation.
Office Action of the Indian application No. 202217027688, issued on Nov. 16, 2022. 5 pages with English translation.
LG Electronics, "Discussion on physical layer structure for NR sidelink", 3GPP TSG RAN WG1 #100_e R1-2000781, Feb. 24-Mar. 6, 2020 the whole document, 32 pages.
First Office Action of the Japanese application No. 2022-552897, issued on Nov. 28, 2023, 8 pages with English translation.
Supplementary European Search Report in the European application No. 23203124.5, mailed on Dec. 14, 2023, 12 pages.
Hearing Notice of the Indian application No. 202217027688, issued on Jan. 19, 2024, 2 pages with English translation.
3GPP TSG RAN WG1 #100e-Meeting, Feb. 24-Mar. 6, 2020, R1-2000489, Source: OPPO, Title: Draft text proposals on physical layer structure for NR-V2X, Agenda Item: 7.2.4.1, Document for: Discussion and Decision.
3GPP TSG-RAN WG1 Meeting #100-e R1-2001015, e-Meeting, Feb. 24-Mar. 6, 2020, Agenda Item: 7.2.4.8, Source: Ericsson, Title: Remaining details on resource pool determination, Document for: Discussion, Decision.
International Search Report in the international application No. PCT/CN2020/083669, mailed on Dec. 30, 2020.

3GPP TSG RAN WG1 Meeting #100-e R1-2000183, Feb. 24-Mar. 6, 2020, Agenda Item: 7.2.4.2.2, Source: Huawei, HiSilicon, Title: Remaining details of sidelink resource allocation mode 2, Document for: Discussion and Decision.
3GPP TSG RAN WG1 Meeting #99 R1-1913465, Reno, USA, Nov. 18-22, 2019, Source: CATT, Title: Feature lead summary on AI 7.2.4.3 Sidelink synchronization mechanism, Agenda Item: 7.2.4.3, Document for: Discussion and Decision.
Notice of Allowance of the Russian application No. 2022123116, issued on Jun. 1, 2023. 25 pages with English translation.
First Office Action of the Chinese application No. 202210814268.3, issued on Aug. 4, 2023. 11 pages with English translation.
ITL. "Physical layer structure for NR V2X" 3GPP TSG RAN WG1 #99 R1-1912370, Nov. 22, 2019 (Nov. 22, 2019), the whole document, 7 pages.
Fujitsu. "Discussion on mode 1 resource allocation for NR V2X" 3GPP TSG RAN WG1 #99 R1-1912078, Nov. 22, 2019 (Nov. 22, 2019), the whole document, 6 pages.
International Search Report in the international application No. PCT/CN2020/074765, mailed on Nov. 6, 2020, 5 pages with English translation.
Office Action of the Indian application No. 202217009578, issued on Sep. 15, 2022, 3 pages with English translation.
Written Opinion of the International Search Authority in the international application No. PCT/CN2020/074765, mailed on Nov. 6, 2020, 9 pages with English translation.
3GPP TSG RAN WG1 #99 R1-1912514, Reno, USA, Nov. 18-22, 2019, Title: NR sidelink physical layer structure, Source: ZTE, Sanechips, Agenda item: 7.2.4.1, Document for: Discussion and decision, 12 pages.
First Office Action of the Chinese application No. 202111176211.7, issued on Mar. 25, 2023, 14 pages with English translation.
Supplementary European Search Report in the European application No. 20918791.3, mailed on Jun. 6, 2023, 11 pages.
First Office Action of the Canadian application No. 3152932, issued on Jun. 30, 2023, 4 pages.
OPPO, "Draft text proposals on physical layer structure for NR-V2X", 3GPP TSG RAN WG1 #100bis, R1-2001745, e-Meeting, Apr. 20-30, 2020, the whole document, 11 pages.
OPPO, "Remaining issues of mode 1 resource allocation for NR-V2X", 3GPP TSG RAN WG1 #100, R1-2000490, e-Meeting, Feb. 24-Mar. 6, 2020, the whole document, 9 pages.
First Office Action of the Japanese application No. 2022-517509, issued on Jan. 26, 2024, 10 pages with English translation.
First Office Action of the European application No. 20918791.3, issued on Feb. 8, 2024, 11 pages.
Non-Final Office Action of the U.S. Appl. No. 17/675,139, issued on Apr. 19, 2024, 35 pages.
Second Office Action of the Canadian application No. 3152932, issued on Apr. 3, 2024, 6 pages.
Fujitsu, "Other aspects on physical layer structure for NR sidelink", 3GPP TSG RAN WG1 #98bis, R1-1910140 Chongqing, China, Oct. 14-20, 2019, the whole document, 11 pages.
CATT, "Physical layer structure for NR sidelink", 3GPP TSG RAN WG1 Meeting #99, R1-1912153, Reno, USA, Nov. 18-22, 2019, the whole document, 22 pages.
"Evolved Universal Terrestrial Radio Access (E-UTRA); Physical layer procedures (Release 15)", 3GPP TS 36.213 V15.6.0, Section 14.1.5, 545 pages.
Notice of Rejection of the Japanese application No. 2022-517509, issued on Jul. 23, 2024, 11 pages with English translation.
First Office Action of the Vietnamese application No. 1-2022-01928, issued on Aug. 30, 2024, 3 pages with English translation.
First Office Action of the Vietnamese application No. 1-2022-05130, issued on Aug. 30, 2024, 4 pages with English translation.

* cited by examiner

TIME-DOMAIN RESOURCE DETERMINATION METHOD AND APPARATUS, AND TERMINAL DEVICE

CROSS-REFERENCE TO RELATED APPLICATION

This is a continuation application of International Patent Application No. PCT/CN2020/083669 filed on Apr. 8, 2020, the contents of which are hereby incorporated by reference in its entirety.

TECHNICAL FIELD

Embodiments of the disclosure relate to the technical field of mobile communication, in particular to a method and apparatus for determining a time domain resource and a terminal device.

BACKGROUND

According to a network coverage condition of a terminal device for communication, the sidelink communication may be divided into sidelink communication within the network coverage, partial network coverage sidelink communication and sidelink communication outside the network coverage. In the case of the partial network coverage sidelink communication, it needs to clarify how to determine a resource pool for a terminal device located in coverage of a base station and a terminal device located outside the coverage of the base station.

SUMMARY

Embodiments of the disclosure provide a method and apparatus for determining a time domain resource and a terminal device.

The method for determining a time domain resource provided by the embodiment of the disclosure includes the following operations.

A terminal device determines a first slot set in a first period according to a first time division duplexing (TDD) configuration in radio resource control (RRC) signaling or a second TDD configuration in a physical sidelink broadcast channel (PSBCH).

The terminal device selects a part of slots from the first slot set according to a first bitmap. The part of slots forms a time domain resource of a resource pool.

The apparatus for determining a time domain resource provided by the embodiment of the disclosure is applied to the terminal device. The apparatus includes a determination unit and a selection unit.

The determination unit is configured to determine a first slot set in a first period according to a first TDD configuration in RRC signaling or a second TDD configuration in a PSBCH.

The selection unit is configured to select a part of slots from the first slot set according to a first bitmap. The part of slots forms a time domain resource of a resource pool.

The terminal device provided by the embodiment of the disclosure includes a processor and a memory. The memory is configured to store a computer program and the processor is configured to call and run the computer program stored in the memory to execute the method for determining a time domain resource.

A chip provided by the embodiment of the disclosure is configured to realize the method for determining a time domain resource.

Specifically, the chip includes a processor configured to call and run a computer program from a memory, to enable a device provided with the chip to execute the method for determining a time domain resource.

A computer readable storage medium provided by the embodiment of the disclosure is configured to store a computer program. The computer program enables a computer to execute the method for determining a time domain resource.

A computer program product provided by the embodiment of the disclosure includes a computer program instruction. The computer program instruction enables a computer to execute the method for determining a time domain resource.

A computer program provided by the embodiment of the disclosure, when run on a computer, enables the computer to execute the method for determining a time domain resource.

Through the above technical solution, for terminal devices inside and outside coverage of a base station, the slot set (i.e., the first slot set) that may be configured as a resource pool in the first period may be determined according to the first TDD configuration in the RRC signaling or the second TDD configuration in the PSBCH, and then, by mapping the first bitmap to the first slot set, it is determined which slots in the first slot set belong to the resource pool. In this way, it may ensure that the terminal devices inside and outside the coverage of the base station may perform sidelink communication normally in the partial network coverage environment, and ensure the utilization of sidelink resources with less system implementation complexity.

BRIEF DESCRIPTION OF THE DRAWINGS

The drawings described herein provide a further understanding of the disclosure and form a part of the disclosure. The schematic embodiments of the disclosure and the description thereof are intended to explain the present disclosure and do not constitute an improper limitation of the present disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the disclosure may be applied to various communication systems, for example, a Long Term Evolution (LTE) system, an LTE Frequency Division Duplex (FDD) system, an LTE Time Division Duplex (TDD) system, a 5G communication system, a future communication system and the like.

Figure 1:
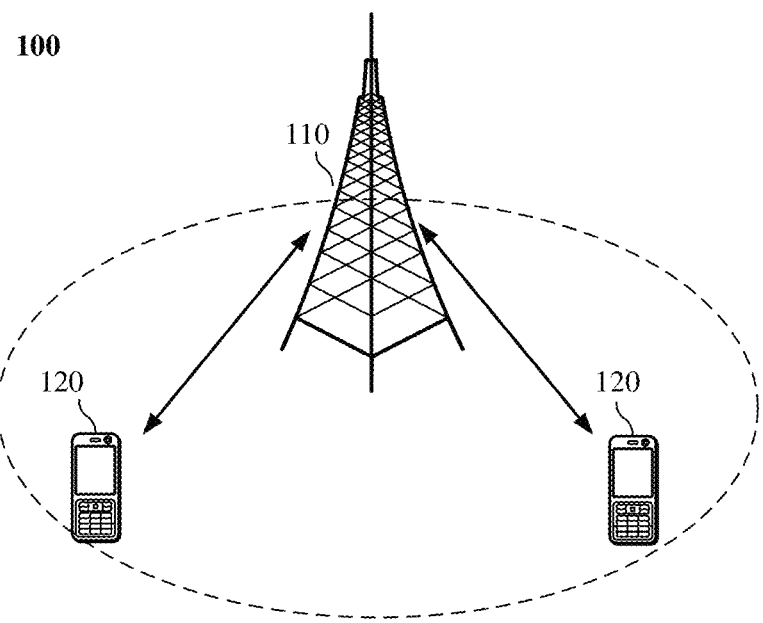
FIG. 1 is a schematic diagram of a communication system architecture provided by an embodiment of the disclosure.

Exemplarily, a communication system 100 to which the embodiments of the present disclosure are applied is illustrated in FIG. 1. The communication system 100 may include a network device 110. The network device 110 may be a device communicating with a terminal device 120 (also referred to as a communication terminal, a terminal). The network device 110 may provide communication coverage for a specific geographic area and may communicate with a terminal device within the coverage area. In one example, the network device 110 may be an Evolutional Node B (eNB or eNodeB) in the LTE system or a wireless controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future communicate system or the like.

The communication system 100 further includes at least one terminal 120 located in the coverage of the network device 110. The "terminal" used herein includes, but is not limited to, connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another terminal arranged to receive/transmit a communication signal; and/or an Internet of Things (IoT) device. A terminal configured to communicate via a wireless interface may be referred to as a "wireless communication terminal", "wireless terminal" or "mobile terminal". Example of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager, Internet/intranet access, a Web browser, memo pad, calendar and/or Global Positioning System (GPS) receiver; and a conventional laptop and/or palmtop receiver or other electronic devices including a radio telephone transceiver. The terminal may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal in a 5G network, a terminal in a future evolved PLMN or the like.

In one example, Device to Device (D2D) communication may be performed between the terminal devices 120.

In one example, the 5G communication system or 5G network may also be referred to as a New Radio (NR) system or NR network.

FIG. 1 exemplarily illustrates one network device and two terminal devices. In one example, the communication system 100 may include multiple network devices and another number of terminal devices may be included in coverage of each network device. There are no limits made thereto in the embodiments of the disclosure.

In one example, the communication system 100 may further include another network entity such as a network controller, a mobility management entity or the like. There are no limits made thereto in the embodiments of the disclosure.

It is to be understood that a device with a communication function in the network/system in the embodiments of the disclosure may be referred to as a communication device. Taking the communication system 100 illustrated in FIG. 1 as an example, the communication system 100 may include the network device 110 and the terminal 120 with the communication function. The network device 110 and the terminal 120 may be specific devices mentioned above, and details are not described herein. The communication system may further include other communication devices, for example, other network entity such as a network controller or a mobility management entity, which is not limited in the embodiments of the present disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

To facilitate understanding of the technical solutions of the embodiments of the present disclosure, the related concepts related to the embodiments of the present disclosure are described below.

Sidelink communication under different network coverage environments

Figure 2A:
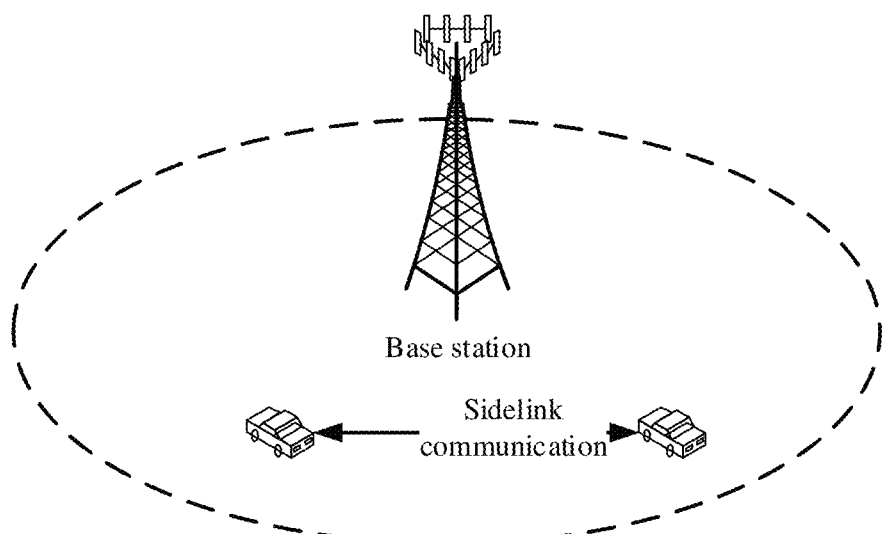
FIG. 2A is a scene diagram of sidelink communication within a network coverage provided by an embodiment of the disclosure.
Figure 2B:
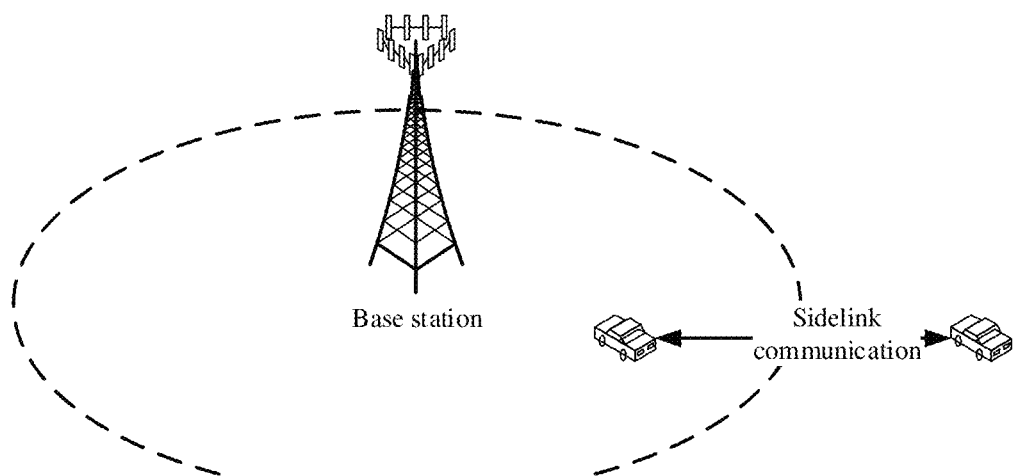
FIG. 2B is a scene diagram of partial network coverage sidelink communication provided by an embodiment of the disclosure.
Figure 2C:
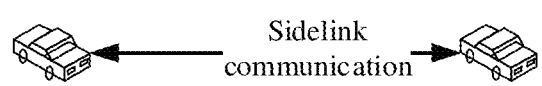
FIG. 2C is a scene diagram of sidelink communication outside a network coverage provided by an embodiment of the disclosure.

According to a network coverage condition of a terminal device for communication, the sidelink communication may be divided into sidelink communication within the network coverage (as illustrated in FIG. 2A), partial network coverage sidelink communication (as illustrated in FIG. 2B) and sidelink communication outside the network coverage (as illustrated in FIG. 2C).

In the sidelink communication within the network coverage, all terminal devices performing sidelink communication are located in the coverage of the same base station. Therefore, all the terminal devices performing sidelink communication may perform sidelink communication based on the same sidelink configuration by receiving the configuration signaling of the base station.

In the partial network coverage sidelink communication, some terminal devices performing sidelink communication are located in the coverage of the base station. These terminal devices may receive the configuration signaling of the base station, and then perform sidelink communication according to the sidelink configuration configured by the base station. A terminal device outside the coverage of the base station may not receive the configuration signaling of the base station. In such case, the terminal device outside the coverage of the base station will determine the sidelink configuration according to pre-configuration information and information carried in the PSBCH sent by the terminal device in the coverage of the base station, and then perform sidelink communication based on the sidelink configuration.

In the sidelink communication outside the network coverage, all terminal devices performing sidelink communication are located outside the coverage of the base station, and all the terminal devices determine the sidelink configuration for sidelink communication according to pre-configuration information.

Method for determining a resource pool of LTE-Vehicle to Everything (V2X)

In the LTE-V2X, a time domain source of the resource pool is determined in a System Frame Number (SFN) period or a Direct Frame Number (DFN) period. Specifically, time domain sources, which belong to the resource pool, in the SFN period or the DFN period are determined in the following modes.

An SFN period or a DFN period includes 10240 subframes, i.e., subframes 0, 1, 2 to 10239. In the 10240 subframes, synchronous subframes, downlink subframes, special subframes (i.e., downlink subframes and special subframes in a TDD system) and reserved subframes are removed, and the remaining subframes are re-numbered to form a subframe set $(t_0^{SL}, t_1^{SL}, \ldots, t_{T_{max}}^{SL})$. The number of the remaining subframes may be divided by $L_{bitmap}$ and $L_{bitmap}$ represents a length of a bitmap for indicating configuration of a resource pool. The bitmap $(b_0, b_1, \ldots, b_{L_{bitmap}})$ for indicating configuration of the resource pool is periodically mapped to each of the remaining subframe, in which a bit value of 1 represents that the subframe corresponding to the bit belongs to the resource pool and a bit value of 0 represents that the subframe corresponding to the bit does not belong to the resource pool.

Figure 3:
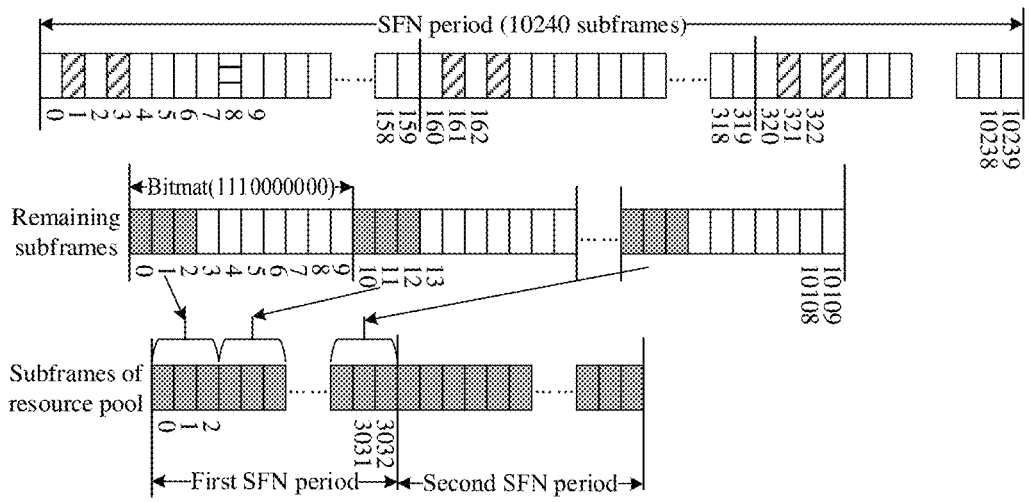
FIG. 3 is a schematic diagram of configuring a resource pool provided by an embodiment of the disclosure.

As illustrated in FIG. 3, FIG. 3 takes an SFN period as an example (the DFN period is the same as the SFN period). One SFN period includes 10240 subframes (i.e., 10240 ms), a period of the synchronizing signal (synchronizing period for short) is 160 ms, and one synchronizing period includes two synchronizing subframes. Therefore, there are totally 128 synchronizing subframes in one SFN period. The length of the bitmap for indicating configuration of the resource pool is 10 bits (i.e., $L_{bitmap}$=10), such that two reserved subframes are needed. The number of remaining subframes is (10240−128−2=10110), which may be divided exactly by the length 10 of the bitmap. The remaining subframes are re-numbered as 0, 1, 2 to 10109, the first three values in the bitmap are 1 and the remaining seven values are 0, that is, $(b_0, b_1, \ldots, b_{L_{bitmap}})$=(1,1,1,0,0,0,0,0,0,0). Therefore, in the remaining subframes, the first three subframes in every 10 subframes belong to the resource pool and the rest does not belong to the resource pool. As the bitmap needs to be repeated for 1011 times in the remaining subframes to indicate whether all subframes belong to the resource pool and three subframes belong to the resource pool in each period of the bitmap, there are totally 3033 subframes belonging to the resource pool in one SFN period.

It may be seen from the above method for determining a resource pool that to uniquely determine a resource pool, the terminal device needs to determine the positions and numbers of different types of subframes, such as downlink subframes, special subframes and uplink subframes, in an SFN period or DFN period, and the above information is determined by a TDD configuration type of the present carrier. In the LTE system, a total of 7 TDD configuration types are defined. Different types of TDD configuration correspond to different positions and numbers of uplink, downlink and special subframes. In order to ensure normal sidelink transmission and reception between different terminal devices, the TDD configuration determined by all terminal devices must be the same. In the sidelink communication within the network coverage or the sidelink communication outside the network coverage, the terminal device may obtain a unified TDD configuration according to configuration information or pre-configuration information of the base station. For the partial network coverage sidelink communication, the terminal device in the coverage of the base station receives configuration signaling from the base station to determine the TDD configuration, and sends the above TDD configuration to a terminal device outside the coverage of the base station through the PSBCH, so as to ensure that the TDD configuration determined by terminal devices inside and outside the coverage of the base station is the same.

Method for calculating a resource reservation period in LTE-V2X

In the LTE-V2X, the terminal device may reserve the same frequency domain resource periodically. Since all resources used for sidelink communication belong to the same resource pool, the reservation period $P_{rsvp\_TX}'$ is represented as the number of subframes in the) set $(t_0^{SL}, t_1^{SL}, \ldots, t_{T_{max}}^{SL})$. $P_{rsvp\_TX}'=P_{step} \times P_{rsvp\_TX}/100$, $P_{rsvp\_TX}$ represents an arrival period of a packet indicated by the high level, and $P_{step}$ is related to the TDD configuration of the present carrier, as illustrated in Table 1.

TABLE 1

| TDD configuration type | $P_{step}$ |
| --- | --- |
| TDD uplink and downlink configuration 0 | 60 |
| TDD uplink and downlink configuration 1 | 40 |
| TDD uplink and downlink configuration 2 | 20 |
| TDD uplink and downlink configuration 3 | 30 |
| TDD uplink and downlink configuration 4 | 20 |
| TDD uplink and downlink configuration 5 | 10 |
| TDD uplink and downlink configuration 6 | 50 |
| other | 100 |

Resource Pool Configuration in NR-V2X

In the NR-V2X, autonomous driving needs to be supported, and therefore there is a higher demand on data interaction between vehicles, for example, higher throughput, lower delay, higher reliability, larger coverage, more flexible resource allocation and the like. Therefore, different from the LTE V2X which mainly support periodical services, in the NR V2X, both periodical services and non-periodical services need to be supported simultaneously, and the non-periodical services may occupy a main proportion. In addition, to reduce a data transmission delay and enhance flexibility of resource allocation, the NR V2X support different Subcarrier Spacings (SCSs) and different slot lengths. Specifically, in the NR V2X, the SCS may be 15 kHz, 30 kHz, 60 kHz or 120 kHz, and the slot length may be 7 to 14 Orthogonal Frequency Division Multiplexing (OFDM) symbols. In the LTE V2X, the SCS is fixed at 15 kHz, and the slot length may be fixed at 14 Single-carrier Frequency-Division Multiple Access (SC-FDMA) symbols.

In addition, to provide more flexible TDD configuration in an NR system, the system may support far more TDD configuration types than the LTE system. Specifically, in the NR system, the TDD configuration type of the carrier is indicated by configuration information TDD-UL-DL-ConfigCommon in the RRC signaling. The TDD-UL-DL-ConfigCommon includes the following parameters: reference Subcarrier Spacing information, and pattern1 and pattern2.

The reference Subcarrier Spacing information is also referred to as reference SubcarrierSpacing and used to determine an SCS of the present carrier.

The pattern1 and pattern2 are used to determine a pattern of uplink and downlink time domain resources (UL-DL). The pattern2 is an optional configuration parameter. Specifically, the pattern1 or the pattern2 may include the following parameters: period information, indication information of the number of downlink slots, indication information of the number of downlink time domain symbols, indication information of the number of uplink slots and indication information of the number of uplink time domain symbols.

I) The period information is also referred to as dl-UL-TransmissionPeriodicity, and used to determine a period of the UL-DL pattern. The period may be 0.5 ms, 0.625 ms, 1 ms, 1.25 ms, 2 ms, 3 ms, 4 ms, 2.5 ms, 5 ms, and 10 ms.

II) The indication information of the number of downlink slots is also referred to as nrofDownlinkSlots, and used to determine that in each period, the nrofDownlinkSlots slots starting from the starting position of the period are full downlink slots.

III) The indication information of the number of downlink time domain symbols is also referred to as nrofDownlinkSymbols, and used to determine that the first nrofDownlinkSymbols symbols of the slot after nrofDownlinkSlots full downlink slots are downlink time domain symbols.

IV) The indication information of the number of uplink slots is also referred to as nrofUplinkSlots, and used to determine that the last nrofUplinkSlots slots in each period are full uplink slots.

V) The indication information of the number of uplink time domain symbols is also referred to as nrofUplinkSymbols, and used to determine that the last nrofUplinkSymbols symbols of the slot before nrofUplinkSlots full uplink slots are uplink time domain symbols.

Similar to the LTE sidelink communication system, the PSBCH is still supported in the NR-V2X. A terminal device in the coverage of the base station sends part of the information (including system frame number, slot index, TDD configuration, etc.) configured by the base station to a terminal device outside the coverage of the base station through the PSBCH. The TDD configuration of the carrier indicated through the PSBCH may be implemented in a manner that the number of patterns configured on the present carrier may be indicated by 1 bit in the PSBCH, the period of up to two patterns on the carrier may be indicated by 4 bits, and the number of full uplink slots of each pattern may be indicated by 7 or 8 bits.

However, due to the limited capacity of the PSBCH, the number of bits used to carry the TDD configuration is unable to support all possible TDD configurations supported in the NR system. In the case of partial network coverage sidelink communication, a terminal device outside the coverage of the base station may not be able to obtain the TDD configuration adopted by a terminal device in the coverage of the base station through the PSBCH. Since the NR sidelink communication adopts a resource pool configuration method similar to that in the LTE sidelink communication, that is, slots included in the resource pool are indicated by the bitmap, the bitmap is mapped to the slots available for sidelink communication in the system frame period, and the slots available for sidelink communication are related to the TDD configuration of the carrier, a resource pool determined by a terminal device outside the coverage of the base station may be different from that determined by a terminal device in the coverage of the base station, which will eventually lead to the failure of normal sidelink communication between the two terminal devices.

To solve the above problems, a new RRC signaling (i.e., base station configuration signaling) may be added on the basis of the existing RRC signaling to indicate that TDD configuration for a terminal device in the coverage of the base station to determine the resource pool is the same as TDD configuration indicated by the PSBCH for a terminal device outside the coverage of the base station to determine the resource pool, so as to ensure that the resource pool determined by terminal devices inside and outside the coverage of the base station is the same, thereby ensuring the normal sidelink communication between terminal devices. However, by introducing additional RRC signaling to ensure the consistency of the resource pool determined by terminal devices inside and outside the coverage of the base station, additional system implementation complexity and standard workload will be introduced.

In addition, when two patterns are configured on the carrier, if the number of slots in each pattern is too large, it will exceed indication capacity of the PSBCH. On the other hand, since TDD configuration is more flexible in the NR system, the calculation method of resource reservation interval in the LTE V2X is not applicable to the NR V2X. Therefore, technical solutions of the embodiments of the disclosure are provided.

Figure 4:
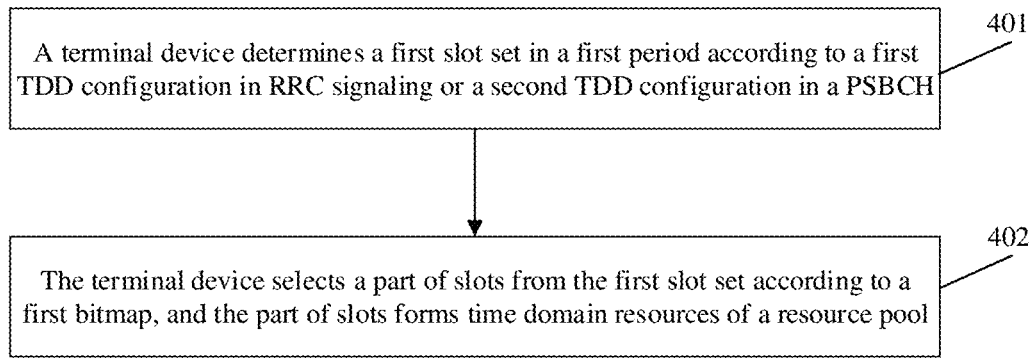
FIG. 4 is a schematic flowchart of a method for determining a time domain resource provided by an embodiment of the disclosure.

FIG. 4 is a schematic flowchart of a method for determining a time domain resource provided by an embodiment of the disclosure. As illustrated in FIG. 4, the method for determining a time domain resource includes the following operations.

In 401, a terminal device determines a first slot set in a first period according to a first TDD configuration in RRC signaling or a second TDD configuration in a PSBCH.

In the embodiment of the disclosure, the first slot set includes a plurality of slots. The first slot set refers to a slot set available for resource pool configuration, i.e., the slots in the first slot set are slots available for the resource pool configuration.

In the embodiment of the disclosure, the terminal device determines the first slot set in the first period. In an optional implementation, the first period is an SFN period. In another optional implementation, the first period is a DFN period.

In an optional implementation of the disclosure, the terminal device determines the first slot set in the first period as follows:

$$t^{SL} = \{t_0^{SL}, t_1^{SL}, \ldots, t_{T_{max}}^{SL}\}; \tag{1}$$

where $0 \leq t_i^{SL} < M \times 2^\mu$, a value of M is the number of subframes in the first period and a value of $\mu$ is determined based on an SCS on a BandWidth Part (BWP).

In one example of the scheme, a value of M is 10240. Taking the SFN period as an example, one SFN period includes 1024 SFNs and one SFN includes 10 subframes, and thus one SFN period includes 10240 subframes.

In one example of the scheme, the value of $\mu$ has an associated relationship with the SCS on the present BWP of the terminal device. Specifically, a correspondence between the value of μ and the SCS is illustrated in Table 2.

TABLE 2

| μ | $\Delta f = 2^{\mu} \cdot 15$ [kHz] |
|---|---|
| 0 | 15 |
| 1 | 30 |
| 2 | 60 |
| 3 | 120 |
| 4 | 240 | where Δf represents the SCS in kHz.

Further, an index of the slots in the scheme is numbered with respect to an index of the first slot in SFN #0 or DFN #0.

In the embodiment of the disclosure, the terminal device determines the first slot set in the first period according to the first TDD configuration in the RRC signaling or the second TDD configuration in the PSBCH. The first TDD configuration is indicated by the configuration information TDD-UL-DL-ConfigCommon in the RRC signaling. The contents in TDD-UL-DL-ConfigCommon may refer to the description on the above related technical solutions.

In the embodiment of the disclosure, the first slot set may be determined in the following modes, which are described separately below. It is to be noted that "full uplink slot" in the following embodiments refer to a slot in which all symbols in the slot are uplink symbols. "Symbols" in the following embodiments refer to OFDM symbols in the time domain.

Mode 1: Case for a Terminal Device in Coverage of a Base Station

Mode 1-1-1: when the terminal device is a terminal device in the coverage of the base station, the first slot set includes all slots other than the following slots in the first period: a first type of slots, a second type of slots, a third type of slots and a fourth type of slots.

The first type of slots refers to slots configured as Sidelink Synchronization Signal Block (S-SSB) resources.

The second type of slots refers to slots in which the number of uplink symbols indicated by the first TDD configuration in the RRC signaling is less than N. N is a positive integer.

The third type of slots refers to full uplink slots, other than the second uplink slot set, in the first uplink slot set. The first uplink slot set refers to an uplink slot set indicated by the first TDD configuration in the RRC signaling, and the second uplink slot set refers to an uplink slot set indicated by the second TDD configuration in the PSBCH.

The fourth type of slots refers to reserved slots.

In one example of the above solution, a value of N is 14 or 12. Specifically, in the case of a normal Cyclic Prefix (CP) length, the second type of slots refers to slots in which the number of uplink symbols indicated by the first TDD configuration in the RRC signaling is less than 14. Alternatively, in the case of an extension CP length, the second type of slots refer to slots in which the number of uplink symbols indicated by the first TDD configuration in the RRC signaling is less than 12.

In such case, the second uplink slot set indicated by the second TDD configuration in the PSBCH may be equal to or less than the first uplink slot set indicated by the first TDD configuration in the RRC signaling.

It is to be noted that the first uplink slot set indicated by the first TDD configuration in the RRC signaling refers to the set of full uplink slots determined based on the first TDD configuration in the RRC signaling. The second uplink slot set indicated by the second TDD configuration in the PSBCH refers to the set of full uplink slots determined based on the second TDD configuration in the PSBCH.

In an optional implementation, when the terminal device determines that the carrier presently used for sidelink communication allows PSBCH transmission, or the resource pool is used for sidelink communication between the terminal device in the coverage of the base station and a terminal device outside the coverage of the base station, the first slot set is determined according to Mode 1-1-1.

The terminal device may determine, according to an instruction of the base station, the carrier presently used for sidelink communication allows PSBCH transmission, or the resource pool is used for sidelink communication between the terminal device in the coverage of the base station and the terminal device outside the coverage of the base station. In one example, if the base station configures for the carrier presently used for sidelink communication a Reference Signal Receiving Power (RSRP) threshold used by the terminal device to determine whether to transmit the PSBCH on the carrier, the terminal device determines that the carrier presently used for sidelink communication allows PSBCH transmission, otherwise, the terminal device determines that the carrier presently used for sidelink communication does not allow PSBCH transmission. The RSRP threshold is also called syncTxThreshIC.

Mode 1-1-2: when the terminal device is a terminal device in the coverage of the base station, the first slot set includes all slots other than the following slots in the second uplink slot set in the first period, and the second uplink slot set refers to an uplink slot set indicated by the second TDD configuration in the PSBCH: a first type of slots and a fourth type of slots.

The first type of slots refers to slots configured as S-SSB resources.

The fourth type of slots refers to reserved slots.

In such case, the second uplink slot set indicated by the second TDD configuration in the PSBCH may be equal to or less than the first uplink slot set indicated by the first TDD configuration in the RRC signaling.

In an optional implementation, when the terminal device determines that the carrier presently used for sidelink communication allows PSBCH transmission, or the resource pool is used for sidelink communication between the terminal device in the coverage of the base station and a terminal device outside the coverage of the base station, the first slot set is determined according to Mode 1-1-2.

The terminal device may determine, according to an instruction of the base station, the carrier presently used for sidelink communication allows PSBCH transmission, or the resource pool is used for sidelink communication between the terminal device in the coverage of the base station and the terminal device outside the coverage of the base station. In one example, if the base station configures for the carrier presently used for sidelink communication a RSRP threshold used by the terminal device to determine whether to transmit the PSBCH on the carrier, the terminal device determines that the carrier presently used for sidelink communication allows PSBCH transmission, otherwise, the terminal device determines that the carrier presently used for sidelink communication does not allow PSBCH transmission. Here, the RSRP threshold is also called as syncTxThreshIC.

Mode 1-1-3: when the terminal device is a terminal device in the coverage of the base station, the first slot set includes all slots other than the following slots in the first period: a first type of slots, a fifth type of slots and a fourth type of slots.

The first type of slots refers to slots configured as S-SSB resources.

The fifth type of slots refers to slots in which Y continuous symbols starting from the symbol X are not all uplink symbols. X and Y are positive integers.

The fourth type of slots refers to reserved slots.

Further, the above fifth type of slots is explained below. If at least one of a downlink symbol, a flexible symbol or an uplink symbol is configured in a slot, and at least one of the Y continuous symbols starting from the X symbol of the slot is not an uplink symbol (i.e., the Y continuous symbols are not all uplink symbols), then the slot belongs to the fifth type of slots. In one example, the fifth type of slots may also be called incomplete uplink slots.

The values of X and Y are determined based on RRC configuration parameters (that is, the fifth type of slots is determined based on the first TDD configuration in the RRC signaling). Alternatively, the values of X and Y are determined based on preconfigured parameters. For example, the values of X and Y are indicated by the base station through the RRC configuration parameters sl-LengthSymbols and sl-StartSymbol respectively. Alternatively, the values of X and Y are indicated by the preconfigured parameters sl-LengthSymbols and sl-StartSymbol.

In one example, in the case of a normal CP length, X=0, Y=14, and in the case of an extended CP length, X=0, Y=12.

In an optional implementation, when the terminal device determines that the carrier presently used for sidelink communication does not allow PSBCH transmission, or the resource pool is not used for sidelink communication between the terminal device in the coverage of the base station and a terminal device outside the coverage of the base station, the first slot set is determined according to Mode 1-1-3.

In one example, if the base station configures for the carrier presently used for sidelink communication a RSRP threshold used by the terminal device to determine whether to transmit the PSBCH on the carrier, the terminal device determines that the carrier presently used for sidelink communication allows PSBCH transmission, otherwise, the terminal device determines that the carrier presently used for sidelink communication does not allow PSBCH transmission. Here, the RSRP threshold is also called as syncTxThreshIC.

Mode 2: Case for a Terminal Device in Coverage of a Base Station and Case for a Terminal Device Outside the Coverage of the Base Station 1) When the terminal device is a terminal device in the coverage of the base station, the first slot set includes all slots other than the following slots in the first period: a first type of slots, a fifth type of slots and a fourth type of slots.

The first type of slots refers to slots configured as S-SSB resources.

The fifth type of slots refers to slots in which Y continuous symbols starting from the symbol X are not all uplink symbols. X and Y are positive integers.

The fourth type of slots refers to reserved slots.

The values of X and Y are determined based on RRC configuration parameters (that is, the fifth type of slots is determined based on the first TDD configuration in the RRC signaling). Alternatively, the values of X and Y are determined based on preconfigured parameters. For example, the values of X and Y are indicated by the base station through the RRC configuration parameters sl-LengthSymbols and sl-StartSymbol respectively. Alternatively, the values of X and Y are indicated by the preconfigured parameters sl-LengthSymbols and sl-StartSymbol.

In one example, in the case of a normal CP length, X=0, Y=14. In the case of an extended CP length, X=0, Y=12.

Further, the terminal device in the coverage of the base station expects that the first uplink slot set indicated by the first TDD configuration in the RRC signaling is the same as the second uplink slot set indicated by the second TDD configuration in the PSBCH. Alternatively, the terminal device expects that the first uplink slot set indicated by the first TDD configuration in the RRC signaling is able to be indicated by the PSBCH.

2) When the terminal device is a terminal device outside the coverage of the base station, the first slot set includes all slots other than the following slots in the second uplink slot set in the first period, and the second uplink slot set refers to an uplink slot set indicated by the second TDD configuration in the PSBCH or an uplink slot set indicated in the preconfiguration: a first type of slots and a fourth type of slots.

The first type of slots refers to slots configured as S-SSB resources.

The fourth type of slots refers to reserved slots.

Further, the terminal device outside the coverage of the base station expects that the first uplink slot set indicated by the first TDD configuration in the RRC signaling is the same as the second uplink slot set indicated by the second TDD configuration in the PSBCH. Alternatively, the terminal device expects that the first uplink slot set indicated by the first TDD configuration in the RRC signaling is able to be indicated by the PSBCH.

In 402, the terminal device selects a part of slots from the first slot set according to a first bitmap, and the part of slots forms time domain resources of a resource pool.

In the embodiments of the disclosure, the first bitmap is used to indicate time domain configuration of the resource pool, and the length of the first bitmap is recorded as $L_{bitmap}$. Further, in one example, the terminal device determines the value of $L_{bitmap}$ according to network configuration signaling or preconfigured signaling.

In a specific implementation, the first bitmap is periodically mapped to each slot in the first slot set. A value of a bit in the first bitmap is the first value, indicating that the slot corresponding to the bit belongs to the resource pool, and the value of the bit in the first bitmap is the second value, indicating that the slot corresponding to the bit does not belong to the resource pool. Further, in one example, the first value is 1 and the second value is 0. In this way, the part of the slots belonging to the resource pool may be extracted from the first slot set.

The technical solutions of the embodiments of the disclosure are illustrated below in combination with specific application examples.

First Application Example

A terminal device in coverage of a base station determines slots in a resource pool according to the following operations.

1. The terminal device determines a slot set $t^{SL}=\{t_0^{SL}, t_1^{SL}, \ldots, t_{T_{max}}^{SL}\}$ that may be configured as the resource pool in a resource pool configuration period P.

The resource pool configuration period P (i.e., the first period) refers to the mapping period of the first bitmap used for the resource pool configuration. For example, the period may be $10240 \times 2^\mu$ slots. In such case, $0 \leq t_i^{SL} < 10240 \times 2^\mu$, where μ is a subcarrier interval index, and the value of μ is related to the SCS on the present BWP.

In one example, according to the implementation mode 1-1-1 of the embodiment, the set $t^{SL}$ includes slots other than the following slots in the period P: the first type of slots, the second type of slots, the third type of slots and the fourth type of slots.

The fourth type of slots refer to the reserved slots, which is used to ensure that the length of the first bitmap for the resource pool configuration may be divided by $T_{max}$. The number of reserved slots may be zero. For example, when periodic resource reservation is not allowed in the resource pool, the number of reserved slots may be constant to zero.

In one example, according to the implementation mode 1-1-2 of the embodiment, the set $t^{SL}$ includes slots, other than the following slots, in the second uplink slot set that may be indicated by the PSBCH in the period P: the first type of slots and the fourth type of slots.

In one example, according to the implementation mode 1-1-3 of the embodiment, if the base station indicates that the carrier presently used for sidelink communication allows PSBCH transmission, or the base station indicates that the resource pool is used for sidelink communication between the terminal device in the coverage of the base station and a terminal device outside the coverage of the base station, the terminal device determines the set $t^{SL}$ according to the above mode 1-1-1 or mode 1-1-2. Otherwise, the set $t^{SL}$ contains slots other than the following slots in period P: the first type of slots, the fifth type of slots and the fourth type of slots.

2. The terminal device maps the first bitmap for the resource pool configuration to the set $t^{SL} = \{t_0^{SL}, t_1^{SL}, \ldots, t_{T_{max}}^{SL}\}$, so as to determine the resource pool.

Second Application Example

1. The terminal device determines a slot set $t^{SL} = \{t_0^{SL}, t_1^{SL}, \ldots, t_{T_{max}}^{SL}\}$ that may be configured as the resource pool in a resource pool configuration period P.

The resource pool configuration period P (i.e., the first period) refers to the mapping period of the first bitmap used for the resource pool configuration. For example, the period may be $10240 \times 2^\mu$ slots. In such case, $0 \leq t_i^{SL} < 10240 \times 2^\mu$, where μ is a subcarrier interval index, and the value of μ is related to the SCS on the present BWP.

For a terminal device in the coverage of the base station, the set $t^{SL}$ includes slots other than the following slots in the period P: the first type of slots, the fifth type of slots and the fourth type of slots.

For a terminal device outside the coverage of the base station, if the terminal device may detect the PSBCH, the set $t^{SL}$ includes slots other than the following slots in the second uplink slot set indicated by the PSBCH in the period P, otherwise, the set $t^{SL}$ contains the slots other than the following slots in the second uplink slot set indicated by pre-configuration in the period P: the first type of slots and the fourth type of slots.

In the embodiment of the disclosure, the terminal device determines a reserved resource interval based on the number of slots available for sidelink communication in the statistical period. The terminal device indicates the reserved resource interval through Sidelink Control Information (SCI).

Specifically, in the NR V2X, the terminal device may reserve unified frequency domain resources according to a certain resource reservation interval $P_{rsvp\_TX}'$ and indicate $P_{rsvp\_TX}'$ through the SCI, where $P_{rsvp\_TX}'$ is represented as the number of slots in the first slot set $t^{SL}$. $P_{rsvp\_TX}'$ is calculated by a physical layer of the terminal device according to the absolute resource reservation period $P_{rsvp\_TX}$, and $P_{rsvp\_TX}$ is provided by an Media Access Control (MAC) layer of the terminal device in milliseconds.

In an optional implementation, the physical layer of the terminal device determines the reserved resource interval according to the following mode:

$$P'_{rsvp\_TX} = \left[ P_{rsvp\_TX} * \frac{P_{step}}{T} \right]; \qquad (2)$$

where $P_{rsvp\_TX}'$ represents the resource reservation interval in slots, $P_{rsvp\_TX}$ represents the absolute resource reservation period in milliseconds, T represents the statistical period, and $P_{step}$ represents the number of slots available for sidelink communication in the statistical period.

The parameters in the above formula (2) are described below.

T represents the slot statistical period available for sidelink transmission. T is a specific value, and the terminal device may determine the value of T according to the standard definition or the configuration or pre-configuration of the base station. For example, T may be 20 ms, 100 ms, 10240 ms. Or, the value of T is set as the minimum absolute resource reservation period (unit: ms) allowed in the resource pool indicated by the RRC layer configuration parameter reservationPeriodAllowed.

$P_{step}$ represents the number of slots available for sidelink transmission in the statistical period T. As for the case where the first slot set $t^{SL}$ is determined according to Mode 1-1-1 or Mode 1-1-2, and the case where the first slot set $t^{SL}$ is determined by the terminal device outside the coverage of the base station in Mode 2, $P_{step}$ represents the number of full uplink slots in the second uplink slot set that may be indicated by the second TDD configuration in the PSBCH in the statistical period T. For the case where the first slot set $t^{SL}$ is determined according to Mode 1-1-3 and the case where the first slot set $t^{SL}$ is determined by the terminal device in the coverage of the base station in Mode 2, $P_{step}$ represents the number of slots in which continuous Y symbols starting from the X symbol in the statistical period T indicated by the first TDD configuration (i.e., TDD-UL-DL-ConfigCommon) in the RRC signaling all are uplink symbols.

In another optional implementation, the physical layer of the terminal device determines the reserved resource interval according to the following mode:

$$P_{rsvp\_TX}' = n \times l; \qquad (3)$$

where $P_{rsvp\_TX}'$ represents the resource reservation interval, l represents the length of the first bitmap, n is a positive integer enabling n=l to be closest to $P_{rsvp\_TX} * P_{step}/T$ $P_{rsvp\_TX}$ represents the absolute resource reservation period, T represents the statistical period, and $P_{step}$ represents the number of slots available for sidelink communication in the statistical period.

In the embodiments of the disclosure, when the terminal device is a terminal device in the coverage of the base station, the terminal device determines the second TDD configuration in the PSBCH according to the first TDD configuration in the RRC signaling. The terminal device transmits the PSBCH, and the PSBCH carries the second TDD configuration. Specifically, the terminal device in the coverage of the base station determines the second TDD configuration indicated in the PSBCH according to the first TDD configuration indicated by TDD-UL-DL-ConfigCommon in the RRC signaling of the base station.

In the embodiments of the disclosure, the second TDD configuration includes at least one of: first indication information, second indication information or third indication information.

The first indication information is used to indicate the number of the patterns.

The second indication information is used to indicate a pattern period.

The third indication information is used to indicate the number of full uplink slots in the first pattern and/or the second pattern.

In an optional implementation, the above indication information may be implemented in the following modes.

The first indication information indicates the number of the patterns through 1 bit $b_0$. For example, $b_0=0$ represents that the number of the patterns configured for the present carrier is 1, and $b_0=1$ represents that the number of the patterns configured for the present carrier is 2.

The second indication information indicates the pattern period through 4 bits $\{b_1, b_2, b_3, b_4\}$. For example, the period of the first pattern and/or the period of the second pattern is indicated by $\{b_1, b_2, b_3, b_4\}$.

The third indication information indicates the number of full uplink slots in the first pattern through m bits $\{b_5, \ldots, b_{5+m-1}\}$, and indicates the number of full uplink slots in the second pattern through n bits $\{b_{5+m}, \ldots, b_{5+m+n-1}\}$. m+n=N, N represents the total number of bits used to indicate the number of full uplink slots in each pattern. In one example, the value of N may be equal to 7 or 8.

In the above solutions, the first pattern may also be called as pattern1 and the second pattern may also be called as pattern2.

Indication of the first indication information and/or the second indication information is described below in combination with different conditions.

A) When the number of patterns indicated by the first TDD configuration in the RRC signaling is 2, and the period of the first pattern and the period of the second pattern are not all 10 ms, if there are no full uplink slots in the first pattern or all slots in the second pattern are full uplink slots, the first indication information in the PSBCH indicates that the number of patterns is 1, and the second indication information indicates the sum of the period of the first pattern and the period of the second pattern.

B) When the number of patterns indicated by the first TDD configuration in the RRC signaling is 2, and the period of at least one of the first pattern or the second pattern is 10 ms, the first indication information in the PSBCH indicates that the number of patterns is 2.

C) When the number of patterns indicated by the first TDD configuration in the RRC signaling is 2, there is at least one full uplink slot in the first pattern and the slots in the second pattern are not all full uplink slots, the first indication information in the PSBCH indicates that the number of patterns is 2.

Figure 5:
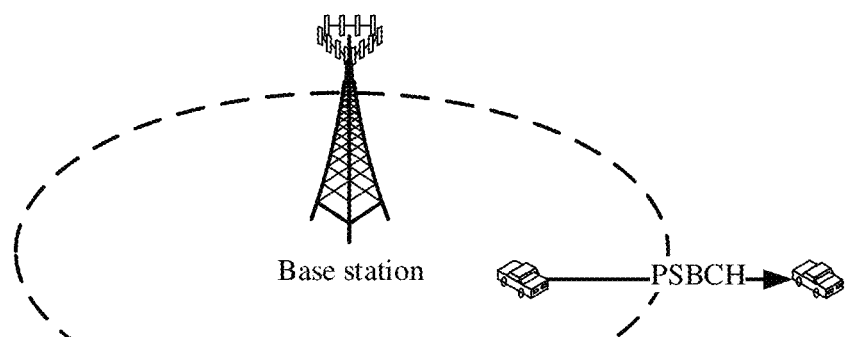
FIG. 5 is a scene diagram of a PSBCH transmission scene provided by an embodiment of the disclosure.

Specifically, FIG. 5 illustrates an example of a transmission scene of the PSBCH. When a terminal device in the coverage of the base station transmits the PSBCH according to configuration information of the base station, the second TDD configuration indicated in the PSBCH is determined according to TDD configuration (i.e., the first TDD configuration) in a cell covered by the base station. When the number of patterns configured on the carrier is 2, the number of full uplink slots on each pattern may not be correctly indicated due to the limitation of PSBCH capacity. Therefore, it is necessary to avoid indicating the configuration of two patterns through the PSBCH as much as possible. For example, if the base station indicates through the first TDD configuration in the RRC signaling (e.g., TDD-UL-DL-ConfigCommon) that the number of patterns is 2, and the periods of the two patterns are not all 10 ms, when there are no full uplink slots in the first pattern or all slots in the second pattern are full uplink slots, the number of patterns may be indicated as 1 and the pattern period is indicated as the sum of the periods of the two patterns in the PSBCH. Further, the terminal device sets $b_0$ to 1 only when one of the following two conditions is met. Condition 1) the number of patterns configured by the base station through TDD-UL-DL-ConfigCommon in the RRC signaling is 2, and the period of one or two patterns is 10 ms. Condition 2) the number of patterns configured by the base station through TDD-UL-DL-ConfigCommon in the RRC signaling is 2, there is at least one full uplink symbol slot in the first pattern, and slots in the second pattern are not all full uplink slots.

In the embodiments of the disclosure, when the first indication information in the PSBCH indicates that the number of patterns is 2 (i.e., when $b_0$ is set to 1), the terminal device determines values of m and n according to the following modes.

Mode a) the terminal device determines the values of m and n in the following mode:

$$m=\lceil\log_2(P_1\times 2^\mu)\rceil, n=N-m; \quad (4)$$

where $P_1$ represents the period of the first pattern in milliseconds.

In this mode, the number of full uplink slots in the first pattern is equal to a decimal representation value corresponding to the m bits plus 1. The number of full uplink slots in the second pattern is equal to a decimal representation value corresponding to the n bits.

Mode b) the terminal device determines the values of m and n in the following mode:

$$\text{if } P_1 \leq P_2,\ m=\lceil\log_2(P_1\times 2^\mu)\rceil,\ n=N-m;$$

$$\text{if } P_1 > P_2,\ m=N-\lceil\log_2(P_2\times 2^\mu)\rceil,\ n=N-m; \quad (5)$$

where $P_1$ represents the period of the first pattern in milliseconds, and $P_2$ represents the period of the second pattern in milliseconds.

In this mode, if $P_1\times 2^\mu \leq 2^m$, the number of full uplink slots in the first pattern is the decimal representation value corresponding to them bits plus 1. If $P_1\times 2^\mu > 2^m$, the number of full uplink slots in the first pattern is the decimal representation value corresponding to the m bits plus 1 and then multiplied by k1. Alternatively, if $P_2\times 2^\mu \leq 2^n$, the number of full uplink slots in the second pattern is the decimal representation value corresponding to the n bits. If $P_2\times 2^\mu > 2^n$, the number of full uplink slots in the second pattern is the decimal representation value corresponding to the n bits multiplied by k2.

k1 is the smallest integer enabling $P_1\times 2^\mu \leq k1\times 2^m$ and k2 is the smallest integer enabling $P_2\times 2^\mu \leq k2\times 2^n$.

In another optional implementation, the above indication information may be implemented in the following modes.

The first indication information indicates the number of patterns through 1 bit $b_0$. For example, $b_0=0$ represents that the number of the patterns configured for the present carrier is 1, and $b_0=1$ represents that the number of the patterns configured for the present carrier is 2.

The second indication information indicates the pattern period through 4 bits $\{b_1, b_2, b_3, b_4\}$. For example, the period of the first pattern and/or the second pattern is indicated through {$b_1$, $b_2$, $b_3$, $b_4$} indicates.

The third indication information indicates the number of full uplink slots in the first pattern and/or the second pattern through N bits {$b_5$, ..., $b_{5+N-1}$}

N represents the total number of bits used to indicate the number of full uplink slots in each pattern. In one example, the value of N may be equal to 7 or 8.

In the above solutions, the first pattern may also be called as pattern1 and the second pattern may also be called as pattern2.

In the embodiments of the disclosure, when the number of patterns indicated by the first TDD configuration in the RRC signaling is 2, the terminal device determines the decimal representation value of the N bits in the PSBCH according to the following mode:

$$D = \lfloor a \times 2^{\mu_{ref} - \mu_{PSBCH}} \rfloor \times (P_2 \times 2^{\mu_{ref}} + 1) + \lfloor b \times 2^{\mu_{ref} - \mu_{PSBCH}} \rfloor; \quad (6)$$

where D represents the decimal representation value of the N bits in the PSBCH, a represents the number of full uplink slots in the first pattern, b represents the number of full uplink slots in the second pattern, $\mu_{ref}$ represents a reference SCS index, and $\mu_{PSBCH}$ represents a configured or pre-configured SCS index on the BWP where PSBCH is located.

In an optional implementation, $\mu_{ref}$ is determined according to the following modes:
- when the sum of the period of the first pattern and the period of the second pattern is less than 4 ms or not greater than 2.5 ms, $\mu_{ref} = \mu_{PSBCH}$;
- when the sum of the period of the first pattern and the period of the second pattern is 4 ms or 5 ms, $\mu_{ref} = \min(\mu_{PSBCH}, 2)$; or,
- when the sum of the period of the first pattern and the period of the second pattern is 10 ms, $\mu_{ref} = \min(\mu_{PSBCH}, 1)$; or,
- when the sum of the period of the first pattern and the period of the second pattern is 20 ms, $\mu_{ref} = 0$.

In another optional implementation, $\mu_{ref}$ is determined according to the following modes:
- when the sum of the period of the first pattern and the period of the second pattern is not greater than 5 ms, $\mu_{ref} = \min(\mu_{PSBCH}, 2)$; or,
- when the sum of the period of the first pattern and the period of the second pattern is greater than 5 ms, $\mu_{ref} = 0$.

In yet another optional implementation, $\mu_{ref}$ is determined according to the following mode: $\mu_{ref} = 0$.

Specifically, FIG. 5 illustrates an example of a transmission scene of the PSBCH. When a terminal device in the coverage of the base station transmits the PSBCH according to configuration information of the base station, the second TDD configuration indicated in the PSBCH is determined according to TDD configuration (i.e., the first TDD configuration) in a cell covered by the base station. When the number of patterns configured on the carrier is 2, the number of full uplink slots on each pattern may not be correctly indicated due to the limitation of the PSBCH capacity. In this case, the number of slots on each pattern may be reduced by defining the reference SCS index $\mu_{ref}$.

For example, when the sum of the periods of the two patterns is less than 4 ms or not greater than 2.5 ms, since the number of slots of the two patterns is within the indication range of N bits, $\mu_{ref} = \mu_{PSBCH}$. $\mu_{PSBCH}$ is the SCS index configured or pre-configured on the BWP where the PSBCH is located. If the sum of the periods of the two patterns is 4 ms or 5 ms, $\mu_{ref} = \min(\mu_{PSBCH}, 2)$. If the sum of the periods of the two patterns is 10 ms, $\mu_{ref} = \min(\mu_{PSBCH}, 1)$. If the sum of the periods of the two patterns is 20 ms, $\mu_{ref} = 0$.

For another example, if the sum of the periods of two patterns is not greater than 5 ms, $\mu_{ref} = \min(\mu_{PSBCH}, 2)$. If the sum of the periods of the two patterns is greater than 5 ms, $\mu_{ref} = 0$.

For another example, if two patterns are configured, $\mu_{ref} = 0$.

According to an implementation mode of the embodiments of the disclosure, for the terminal device transmitting the PSBCH, the decimal representation value of N bits in the PSBCH is $D = \lfloor a \times 2^{\mu_{ref} - \mu_{PSBCH}} \rfloor \times (P_2 \times 2^{\mu_{ref}} + 1) + \lfloor b \times 2^{\mu_{ref} - \mu_{PSBCH}} \rfloor$ where a is the number of full uplink slots in the first pattern and b is the number of full uplink slots in the second pattern. For the terminal device receiving the PSBCH, the number of full uplink slots in the first pattern indicated in the PSBCH is $$A = \left\lfloor \frac{D}{P_2 \times 2^{\mu_{ref}} + 1} \right\rfloor \times 2^{\mu_{PSBCH} - \mu_{ref}},$$

and the number of full uplink slots in the second pattern indicated in the PSBCH is $B = \mathrm{mod}(D, P_2 \times 2^{\mu_{ref}} + 1) \times 2^{\mu_{PSBCH} - \mu_{ref}}$.

According to another implementation mode of the embodiments of the disclosure, for the terminal device transmitting the PSBCH, the decimal representation value of N bits in the PSBCH is $D = \lfloor a \times 2^{\mu_{ref} - \mu_{PSBCH}} \rfloor \times (P_2 \times 2^{\mu_{ref}}) + \in b \times 2^{\mu_{ref} - \mu_{PSBCH}} \rfloor$, where a is the number of full uplink slots in the first pattern and b is the number of full uplink slots in the second pattern. For the terminal device receiving the PSBCH, the number of full uplink slots in the first pattern indicated in the PSBCH is $$A = \left\lfloor \frac{D}{P_2 \times 2^{\mu_{ref}}} \right\rfloor \times 2^{\mu_{PSBCH} - \mu_{ref}},$$

and the number of full uplink slots in the second pattern indicated in the PSBCH is $B = \mathrm{mod}(D, P_2 \times 2^{\mu_{ref}}) \times 2^{\mu_{PSBCH} - \mu_{ref}}$. In this implementation mode, if the number of patterns configured by TDD-UL-DL-ConfigCommon is 2 and all slots in the second pattern are full uplink slots, $b_0$ should be set to 0, and the period corresponding to {$b_1$, $b_2$, $b_3$, $b_4$} should be the sum of the periods of the two patterns. In such case, the maximum period may be 20 ms.

According to the technical solutions of the embodiments of the disclosure, the terminal device may determine the slots that may be configured as a resource pool and determine the resource reservation interval according to the slots available for sidelink transmission indicated in the RRC signaling and the slots available for sidelink transmission indicated by the PSBCH, so as to ensure that terminal devices inside and outside the coverage of the base station may perform sidelink communication normally in the partial network coverage environment, and ensure the utilization of sidelink resources with less system implementation complexity.

Figure 6:
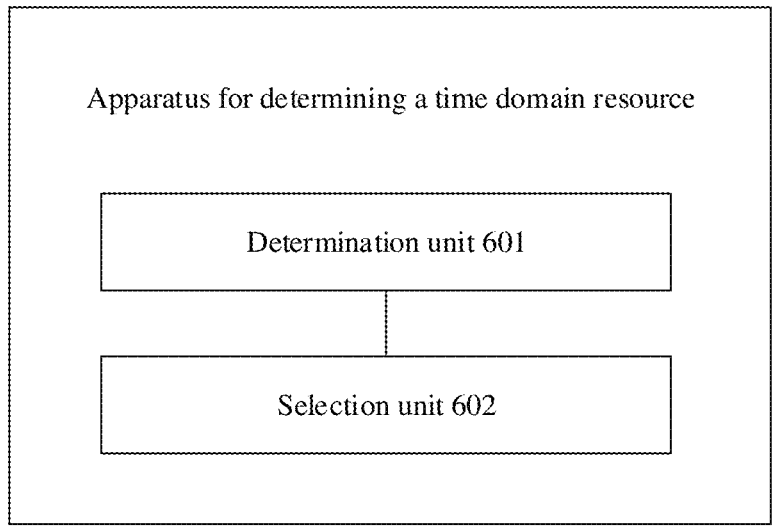
FIG. 6 is a schematic diagram of a structural composition of an apparatus for determining a time domain resource provided by an embodiment of the disclosure.

FIG. 6 is a schematic diagram of a structural composition of an apparatus for determining a time domain resource provided by an embodiment of the disclosure. The apparatus is applied to the terminal device. As illustrated in FIG. 6, the apparatus for determining the time domain resource includes a determination unit 601 and a selection unit 602.

The determination unit 601 is configured to determine a first slot set in a first period according to a first TDD configuration in RRC signaling or a second TDD configuration in a PSBCH.

The selection unit 602 is configured to select a part of slots from the first slot set according to a first bitmap. The part of slots forms a time domain resource of a resource pool.

In an optional implementation, the determination unit 601 is configured to determine the first slot set in the first period as follows:

$$t^{SL} = \{t_0^{SL}, t_1^{SL}, \ldots, t_{T_{max}}^{SL}\};$$

where $0 \leq t_i^{SL} < M \times 2^\mu$, M is the number of subframes in the first period and μ is determined based on a SCS on a BWP.

In an optional implementation, when the terminal device is a terminal device in coverage of a base station, the first slot set includes all slots other than the following slots in the first period: a first type of slots, a second type of slots, a third type of slots and a fourth type of slots.

The first type of slots refers to slots configured as S-SSB resources.

The second type of slots refers to slots in which the number of uplink symbols indicated by the first TDD configuration in the RRC signaling is less than N. N is a positive integer.

The third type of slots refers to full uplink slots, other than the second uplink slot set, in the first uplink slot set. The first uplink slot set refers to an uplink slot set indicated by the first TDD configuration in the RRC signaling, and the second uplink slot set refers to an uplink slot set indicated by the second TDD configuration in the PSBCH.

The fourth type of slots refers to reserved slots.

In an optional implementation, the second type of slots being the slots in which the number of uplink symbols indicated by the first TDD configuration in the RRC signaling is less than N includes:

in the case of a normal CP length, the second type of slots refer to the slots in which the number of uplink symbols indicated by the first TDD configuration in the RRC signaling is less than 14; or, in the case of an extension CP length, the second type of slots refer to the slots in which the number of uplink symbols indicated by the first TDD configuration in the RRC signaling is less than 12.

In an optional implementation, when the terminal device is a terminal device in the coverage of the base station, the first slot set includes all slots other than the following slots in the second uplink slot set in the first period, and the second uplink slot set refers to the uplink slot set indicated by the second TDD configuration in the PSBCH: a first type of slots and a fourth type of slots.

The first type of slots refers to slots configured as S-SSB resources.

The fourth type of slots refers to reserved slots.

In an optional implementation, the determination unit 601 is further configured to determine that a carrier presently used for sidelink communication allows PSBCH transmission, or the resource pool is used for sidelink communication between the terminal device in the coverage of the base station and a terminal device outside the coverage of the base station.

In an optional implementation, when the terminal device is a terminal device in the coverage of the base station, the first slot set includes all slots other than the following slots in the first period: a first type of slots, a fifth type of slots and a fourth type of slots.

The first type of slots refers to slots configured as S-SSB resources.

The fifth type of slots refers to slots in which Y continuous symbols starting from the symbol X are not all uplink symbols. X and Y are positive integers.

The fourth type of slots refers to reserved slots.

In an optional implementation, values of X and Y are determined based on RRC configuration parameters; or, the values of X and Y are determined based on preconfigured parameters.

In an optional implementation, the determination unit 601 is further configured to determine that the carrier presently used for sidelink communication does not allow PSBCH transmission, or the resource pool is not used for sidelink communication between the terminal device in the coverage of the base station and a terminal device outside the coverage of the base station.

In an optional implementation, when the terminal device is a terminal device outside the coverage of the base station, the first slot set includes all slots other than the following slots in the second uplink slot set in the first period, and the second uplink slot set refers to the uplink slot set indicated by the second TDD configuration in the PSBCH: a first type of slots and a fourth type of slots.

The first type of slots refers to slots configured as S-SSB resources.

The fourth type of slots refers to reserved slots.

In an optional implementation, the terminal device expects that the first uplink slot set indicated by the first TDD configuration in the RRC signaling is the same as the second uplink slot set indicated by the second TDD configuration in the PSBCH; or, the terminal device expects that the first uplink slot set indicated by the first TDD configuration in the RRC signaling is able to be indicated by the PSBCH.

In an optional implementation, the determination unit 601 is further configured to determine a reserved resource interval based on the number of slots available for sidelink communication in the statistical period.

The apparatus also includes an indication unit (not illustrated in FIG. 6), configured to indicate the reserved resource interval through SCI.

In an optional implementation, the determination unit 601 is configured to determine the reserved resource interval according to the following mode:

$$P'_{rsvp_{TX}} = \left\lceil P_{rsvp_{TX}} * \frac{P_{step}}{T} \right\rceil;$$

where $P_{rsvp\_TX}'$ represents the resource reservation interval in slots, $P_{rsvp\_TX}$ represents an absolute resource reservation period in milliseconds, T represents the statistical period, and $P_{step}$ represents the number of slots available for sidelink communication in the statistical period.

In an optional implementation, the determination unit 601 is configured to determine the reserved resource interval according to the following modes:

$$P_{rsvp\_TX}' = n \times l;$$

where $P_{rsvp\_TX}'$ represents the resource reservation interval, l represents the length of the first bitmap, n is a positive integer enabling n×l to be closest to $P_{rsvp\_TX} * P_{step}/T$ $P_{rsvp\_TX}$ represents the absolute resource reservation period, T represents the statistical period, and $P_{step}$ represents the number of slots available for sidelink communication in the statistical period.

In an optional implementation, when the terminal device is a terminal device in the coverage of the base station, the determination unit 601 is also configured to determine the second TDD configuration in the PSBCH according to the first TDD configuration in the RRC signaling.

The apparatus also includes a transmission unit (not illustrated in FIG. 6), configured to transmit the PSBCH. The PSBCH carries the second TDD configuration.

In an optional implementation, the second TDD configuration includes at least one of first indication information, second indication information, or third indication information.

The first indication information is used to indicate the number of the patterns, The second indication information is used to indicate a pattern period.

The third indication information is used to indicate the number of full uplink slots in the first pattern and/or the second pattern.

In an optional implementation, the third indication information indicates the number of full uplink slots in the first pattern through m bits $\{b_5, \ldots, b_{5+m-1}\}$, and indicates the number of full uplink slots in the second pattern through n bits $\{b_{5+m}, \ldots, b_{5+m+n-1}\}$ $m+n=N$, and N represents the total number of bits used for indicating the number of full uplink slots in each pattern.

In an optional implementation, when the number of patterns indicated by the first TDD configuration in the RRC signaling is 2, and the period of the first pattern and the period of the second pattern are not all 10 ms, if there are no full uplink slots in the first pattern or all slots in the second pattern are full uplink slots, the first indication information in the PSBCH indicates that the number of patterns is 1, and the second indication information indicates the sum of the period of the first pattern and the period of the second pattern.

In an optional implementation, when the number of patterns indicated by the first TDD configuration in the RRC signaling is 2 and the period of at least one of the first pattern and the second pattern is 10 ms, the first indication information in the PSBCH indicates that the number of the patterns is 2.

In an optional implementation, when the number of patterns indicated by the first TDD configuration in the RRC signaling is 2, there is at least one full uplink slot in the first pattern, and the slots in the second pattern are not all full uplink slots, the first indication information in the PSBCH indicates that the number of the patterns is 2.

In an optional implementation, when the first indication information in the PSBCH indicates that the number of the patterns is 2, the determination unit is further configured to determine the values of m and the n in the following mode:

$$m=\lceil \log_2(P_1 \times 2^\mu) \rceil, n=N-m;$$

where $P_1$ represents the period of the first pattern in milliseconds.

In an optional implementation, the number of full uplink slots in the first pattern is equal to the decimal representation value corresponding to the m bits plus 1.

The number of full uplink slots in the second pattern is equal to the decimal representation value corresponding to the n bits.

In an optional implementation, when the first indication information in the PSBCH indicates that the number of the patterns is 2, the determination unit 601 is further configured to determine the values of m and n in the following modes:

$$\text{if } P_1 \leq P_2, \ m=\lceil \log_2(P_1 \times 2^\mu) \rceil, n=N-m;$$

$$\text{if } P_1 > P_2, \ m=N-\lceil \log_2(P_2 \times 2^\mu) \rceil, n=N-m;$$

where $P_1$ represents the period of the first pattern in milliseconds, and $P_2$ represents the period of the second pattern in milliseconds.

In an optional implementation, if $P_1 \times 2^\mu \leq 2^m$, the number of full uplink slots in the first pattern is equal to the decimal representation value corresponding to the m bits plus 1, and if $P_1 \times 2^\mu > 2^m$, the number of full uplink slots in the first pattern is equal to the decimal representation value corresponding to the m bits plus 1 and then multiplied by k1.

Alternatively, if $P_2 \times 2^\mu \leq 2^n$, the number of full uplink slots in the second pattern is the decimal representation value corresponding to n bits, and if $P_2 \times 2^\mu > 2^n$, the number of full uplink slots in the second pattern is the decimal representation value corresponding to n bits multiplied by k2.

k1 is the smallest integer enabling $P_1 \times 2^\mu \leq k1 \times 2^m$ and k2 is the smallest integer enabling $P_2 \times 2^\mu \leq k2 \times 2^n$.

In an optional implementation, the third indication information indicates the number of full uplink slots in the first pattern and/or the second pattern through N bits $\{b_5, \ldots, b_{5+N-1}\}$.

N represents the total number of bits used for indicating the number of full uplink slots in each pattern.

In an optional implementation, when the number of patterns indicated by the first TDD configuration in the RRC signaling is 2, the determination unit 601 is further configured to determine a decimal representation value of the N bits in the PSBCH in the following mode:

$$D=\lfloor a \times 2^{\mu_{ref}-\mu_{PSBCH}} \rfloor \times (P_2 \times 2^{\mu_{ref}}+1)+\lfloor b \times 2^{\mu_{ref}-\mu_{PSBCH}} \rfloor;$$

D represents the decimal representation value of N bits in the PSBCH, a represents the number of full uplink slots in the first pattern, b represents the number of full uplink slots in the second pattern, $\mu_{ref}$ represents a reference SCS index, and $\mu_{PSBCH}$ represents a configured or pre-configured SCS index on the BWP where PSBCH is located.

In an optional implementation, $\mu_{ref}$ is determined according to one of the following modes.

When the sum of the period of the first pattern and the period of the second pattern is less than 4 ms or not greater than 2.5 ms, $\mu_{ref}=\mu_{PSBCH}$.

When the sum of the period of the first pattern and the period of the second pattern is 4 ms or 5 ms, $\mu_{ref}=\min(\mu_{PSBCH}, 2)$ When the sum of the period of the first pattern and the period of the second pattern is 10 ms, $\mu_{ref}=\min(\mu_{PSBCH}, 1)$.

When the sum of the period of the first pattern and the period of the second pattern is 20 ms, $\mu_{ref}=0$.

In an optional implementation, $\mu_{ref}$ is determined according to one of the following modes.

When the sum of the period of the first pattern and the period of the second pattern is not greater than 5 ms, $\mu_{ref}=\min(\mu_{PSBCH}, 2)$.

When the sum of the period of the first pattern and the period of the second pattern is greater than 5 ms, $\mu_{ref}=0$.

In an optional implementation, $\mu_{ref}$ is determined according to the following mode:

$$\mu_{ref}=0.$$

In an optional implementation, the first period is an SFN period or a DFN period.

It should be understood by those skilled in the art that the description of the above apparatus for determining a time domain resource of the embodiments of the present disclosure may be understood with reference to the related description of the method for determining a time domain resource of the embodiments of the present disclosure.

Figure 7:
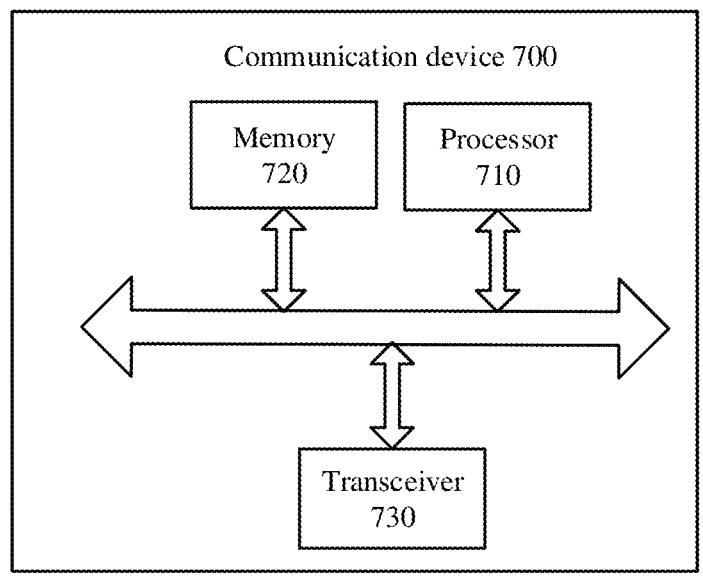
FIG. 7 is a schematic structural diagram of a communication device provided by an embodiment of the disclosure.

FIG. 7 is a schematic structural diagram of a communication device 700 provided by an embodiment of the disclosure. The communication device may be a terminal device or a network device. The communication device 700 illustrated in FIG. 7 includes a processor 710. The processor 710 may call and run a computer program from a memory to implement the method in the embodiments of the disclosure.

In one example, as illustrated in FIG. 7, the communication device 700 may further include a memory 720. The processor 710 may call and run a computer program from the memory 720 to implement the method in the embodiments of the disclosure.

The memory 720 may be a separate device from the processor 710, or may be integrated into the processor 710.

In one example, as illustrated in FIG. 7, the communication device 700 may also include a transceiver 730. The processor 710 may control the transceiver 730 to communicate with another device, specifically, to transmit information or data to another device, or receive information or data from another device.

The transceiver 730 may include a transmitter and a receiver. The transceiver 730 may further include one or more antennas.

In one example, the communication device 700 may specifically be the network device in the embodiments of the present disclosure. The communication device 700 may implement corresponding processes implemented by the network device in each method of the embodiments of the present disclosure, which will not be elaborated herein for brief description.

In one example, the communication device 700 may specifically be a mobile terminal/terminal device in the embodiments of the present disclosure. The communication device 700 may implement corresponding processes implemented by the mobile terminal/terminal device in each method of the embodiments of the present disclosure, which will not be elaborated herein for brief description.

Figure 8:
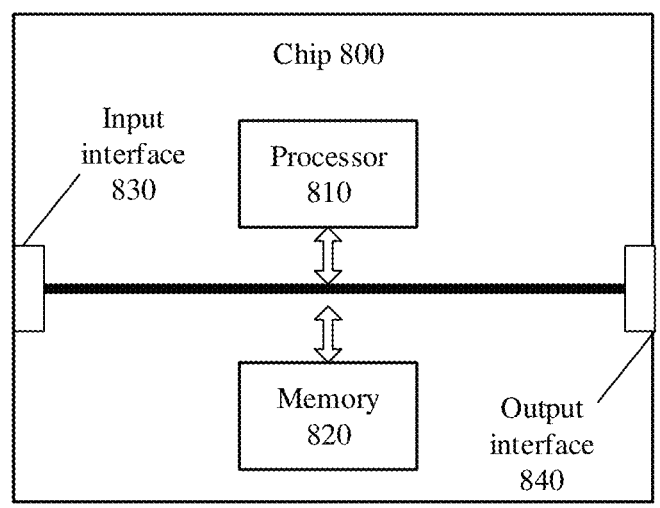
FIG. 8 is a schematic structural diagram of a chip provided by an embodiment of the disclosure.

FIG. 8 is a schematic structural diagram of a chip provided by an embodiment of the disclosure. The chip 800 illustrated in FIG. 8 includes a processor 810. The processor 810 may call and run a computer program from a memory to implement the method in the embodiments of the disclosure.

In one example, as illustrated in FIG. 8, the chip 800 may further include a memory 820. The processor 810 may call and run the computer program from the memory 820 to implement the method in the embodiment of the disclosure.

The memory 820 may be a separate device from the processor 810, or may be integrated into the processor 810.

In one example, the chip 800 may further include an input interface 830. The processor 810 may control the input interface 830 to communicate with another device or chip, and specifically, may acquire information or data transmitted by another device or chip.

In one example, the chip 800 may further include an output interface 840. The processor 810 may control the output interface 840 to communicate with another device or chip, and specifically, may output information or data to another device or chip.

In one example, the chip may be applied to the network device in the embodiments of the disclosure. The chip may implement corresponding processes implemented by the network device in each method of the embodiments of the disclosure, which will not be elaborated herein for brief description.

In one example, the chip may be applied to the mobile terminal/terminal device in the embodiments of the disclosure. The chip may implement corresponding processes implemented by the mobile terminal/terminal device in each method of the embodiments of the disclosure, which will not be elaborated herein for brief description.

It is to be understood that in the embodiments of the disclosure, the chip may also be referred to as a system level chip, a system chip, a chip system or a system-on-chip.

Figure 9:
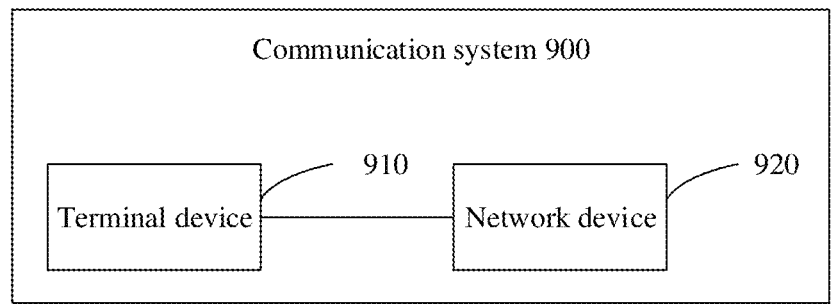
FIG. 9 is a schematic block diagram of a communication system provided by an embodiment of the disclosure.

FIG. 9 is a schematic block diagram of a communication system 900 provided by an embodiment of the disclosure. As illustrated in FIG. 9, the communication system 900 includes a terminal device 910 and a network device 920.

The terminal device 910 may implement the corresponding functions implemented by the terminal device in the above methods, and the network device 920 may implement the corresponding functions implemented by the network device in the above methods. Details will not be elaborated herein for brief description.

It is to be understood that in the embodiments of the disclosure, the processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the method in combination with hardware.

It may be understood that the memory in the embodiment of the disclosure may be a volatile memory or a non-volatile memory, or may include both the volatile and nonvolatile memories. The nonvolatile memory may be a ROM, a PROM, an EPROM, an EEPROM, or a flash memory. The volatile memory may be a RAM, which is used as an external cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other proper types.

The embodiments of the disclosure also provide a computer-readable storage medium for storing a computer program.

In one example, the computer-readable storage medium may be applied to the network device of the embodiments of the disclosure. The computer program may enable a computer to perform the corresponding processes implemented by the network device in each method of the embodiments of the disclosure, which will not be elaborated herein for brief description.

In one example, the computer-readable storage medium may be applied to the mobile terminal/terminal device of the embodiments of the disclosure. The computer program may enable a computer to perform the corresponding processes implemented by the mobile terminal/terminal device in each method of the embodiments of the disclosure, which will not be elaborated herein for brief description.

The embodiments of the disclosure also provide a computer program product. The computer program product includes a computer program instruction.

In one example, the computer program product may be applied to the network device of the embodiments of the disclosure. The computer program instruction may enable a computer to perform the corresponding processes implemented by the network device in each method of the embodiments of the disclosure, which will not be elaborated herein for brief description.

In one example, the computer program product may be applied to the mobile terminal/terminal device of the embodiments of the disclosure. The computer program instruction may enable a computer to perform the corresponding processes implemented by the mobile terminal/terminal device in each method of the embodiments of the disclosure, which will not be elaborated herein for brief description.

The embodiments of the disclosure also provide a computer program.

In one example, the computer program may be applied to the network device of the embodiments of the disclosure. The computer program, when running in a computer, enables the computer to perform the corresponding processes implemented by the network device in each method of the embodiments of the disclosure, which will not be elaborated herein for brief description.

In one example, the computer program may be applied to the mobile terminal/terminal device of the embodiments of the disclosure. The computer program, when running in a computer, enables the computer to perform the corresponding processes implemented by the mobile terminal/terminal device in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including multiple instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for determining a time domain resource, comprising:
  determining, by a terminal device, a first slot set in a first period according to a first time division duplexing (TDD) configuration in radio resource control (RRC)

signaling or a second TDD configuration in a physical sidelink broadcast channel (PSBCH); and selecting, by the terminal device, a part of slots from the first slot set according to a first bitmap, wherein the part of slots forms a time domain resource of a resource pool;

wherein the method further comprises:

determining, by the terminal device, a resource reservation interval based on a number of slots available for sidelink communication in a statistical period in the following mode:

where $P_{rsvp\_TX}'$ represents the resource reservation interval in slots, $P_{rsvp\_TX}$ represents an absolute resource reservation period in milliseconds, T represents the statistical period, and $P_{step}$ represents the number of slots available for sidelink communication in the statistical period.

2. The method according to claim 1, wherein determining the first slot set in the first period comprises:

determining the first slot set in the first period as follows:

$$t^{SL}=\{t_0^{SL}, t_1^{SL}, \ldots, t_{T_{max}}^{SL}\};$$

where $0 \leq t_i^{SL} < M \times 2^\mu$, M is a number of subframes in the first period and u is determined based on a subcarrier spacing (SCS) on a bandwidth part (BWP).

3. The method according to claim 2, wherein when the terminal device is a terminal device in coverage of a base station, the first slot set comprises all slots other than the following slots in the first period:

a first type of slots, the first type of slots being slots configured as sidelink synchronization signal block (S-SSB) resources;

a second type of slots, the second type of slots being slots in which a number of uplink symbols indicated by the first TDD configuration in the RRC signaling is less than N, and N being a positive integer;

a third type of slots, the third type of slots being full uplink slots, other than a second uplink slot set, in a first uplink slot set, the first uplink slot set being an uplink slot set indicated by the first TDD configuration in the RRC signaling, and the second uplink slot set being an uplink slot set indicated by the second TDD configuration in the PSBCH; and a fourth type of slots, the fourth type of slots being reserved slots.

4. The method according to claim 3, wherein that the second type of slots being the slots in which the number of uplink symbols indicated by the first TDD configuration in the RRC signaling is less than N comprises:

for a normal cyclic prefix (CP) length, the second type of slots are slots in which the number of uplink symbols indicated by the first TDD configuration in the RRC signaling is less than 14; or, for an extension CP length, the second type of slots are slots in which the number of uplink symbols indicated by the first TDD configuration in the RRC signaling is less than 12.

5. The method according to claim 1, when the terminal device is a terminal device in coverage of a base station, the method further comprises:

determining, by the terminal device, the second TDD configuration in the PSBCH according to the first TDD configuration in the RRC signaling; and transmitting, by the terminal device, the PSBCH, wherein the PSBCH carries the second TDD configuration.

6. The method according to claim 5, wherein the second TDD configuration comprises at least one of the following:

first indication information used to indicate a number of patterns;

second indication information used to indicate a pattern period; and third indication information used to indicate a number of full uplink slots in the first pattern and/or the second pattern.

7. The method according to claim 6, wherein the third indication information indicates the number of full uplink slots in the first pattern and/or the second pattern through N bits $\{b_5, \ldots, b_{5+N-1}\}$;

wherein N represents a total number of bits used for indicating the number of full uplink slots in each pattern.

8. The method according to claim 7, when a number of the patterns indicated by the first TDD configuration in the RRC signaling is 2, the method comprises:

determining, by the terminal device, a decimal representation value of the N bits in the PSBCH in the following mode:

$$D=\lfloor a \times 2^{\mu_{ref}-\mu_{PSBCH}} \rfloor \times (P_2 \times 2^{\mu_{ref}}+1)+\lfloor b \times 2^{\mu_{ref}-\mu_{PSBCH}} \rfloor;$$

where D represents the decimal representation value of the N bits in the PSBCH, a represents the number of full uplink slots in the first pattern, b represents the number of full uplink slots in the second pattern, $\mu_{ref}$ represents a reference SCS index, and $\mu_{PSBCH}$ represents a configured or pre-configured SCS index on a BWP where the PSBCH is located.

9. The method according to claim 8, wherein $\mu_{ref}$ is determined in the following mode:

when a sum of the period of the first pattern and the period of the second pattern is less than 4 ms or not greater than 2.5 ms, $\mu_{ref}=\mu_{PSBCH}$; or, when the sum of the period of the first pattern and the period of the second pattern is 4 ms or 5 ms, $\mu_{ref}=\min(\mu_{PSBCH}, 2)$; or, when the sum of the period of the first pattern and the period of the second pattern is 10 ms, $\mu_{ref}=\min(\mu_{PSBCH}, 1)$; or, when the sum of the period of the first pattern and the period of the second pattern is 20 ms, $\mu_{ref}=0$.

10. An apparatus for determining a time domain resource, applied to a terminal device, the apparatus comprising:

a memory, configured to store a computer program; and a processor, configured to call and run the computer program stored in the memory to:

determine a first slot set in a first period according to a first time division duplexing (TDD) configuration in radio resource control (RRC) signaling or a second TDD configuration in a physical sidelink broadcast channel (PSBCH); and select a part of slots from the first slot set according to a first bitmap, wherein the part of slots forms a time domain resource of a resource pool;

wherein the processor is further configured to determine a resource reservation interval based on the number of slots available for sidelink communication in a statistical period in the following mode:

where $P_{rsvp\_TX}'$ represents the resource reservation interval in slots, $P_{rsvp\_TX}$ represents an absolute resource reservation period in milliseconds, T represents the statistical period, and $P_{step}$ represents the number of slots available for sidelink communication in the statistical period.

11. The apparatus according to claim 10, wherein when the terminal device is a terminal device in coverage of a base station, the processor is further configured to determine the second TDD configuration in the PSBCH according to the first TDD configuration in the RRC signaling; and the apparatus further comprises a transceiver configured to transmit the PSBCH, wherein the PSBCH carries the second TDD configuration.

12. The apparatus according to claim 11, wherein the second TDD configuration comprises at least one of the following:

first indication information used to indicate a number of patterns;

second indication information used to indicate a pattern period; and third indication information used to indicate a number of full uplink slots in the first pattern and/or the second pattern.

13. The apparatus according to claim 12, wherein the third indication information indicates the number of full uplink slots in the first pattern and/or the second pattern through N bits $\{b_5, \ldots, b_{5+N-1}\}$;

wherein N represents a total number of bits used for indicating the number of full uplink slots in each pattern.

14. The apparatus according to claim 13, wherein when a number of the patterns indicated by the first TDD configuration in the RRC signaling is 2, the processor is further configured to determine a decimal representation value of the N bits in the PSBCH in the following mode:

$$D = \lfloor a \times 2^{\mu_{ref} - \mu PSBCH} \rfloor \times (P_2 \times 2^{\mu_{ref}} + 1) + \lfloor b \times 2^{\mu_{ref} - \mu PSBCH} \rfloor;$$

where D represents the decimal representation value of the N bits in the PSBCH, a represents the number of full uplink slots in the first pattern, b represents the number of full uplink slots in the second pattern, $\mu_{ref}$ represents a reference SCS index, and $\mu_{PSBCH}$ represents a configured or pre-configured SCS index on a BWP where the PSBCH is located.

15. The apparatus according to claim 14, wherein $\mu_{ref}$ is determined in the following mode:

when a sum of the period of the first pattern and the period of the second pattern is less than 4 ms or not greater than 2.5 ms, $\mu_{ref} = \mu_{PSBCH}$; or, when the sum of the period of the first pattern and the period of the second pattern is 4 ms or 5 ms, $\mu_{ref} = \min(\mu_{PSBCH}, 2)$; or, when the sum of the period of the first pattern and the period of the second pattern is 10 ms, $\mu_{ref} = \min(\mu_{PSBCH}, 1)$; or, when the sum of the period of the first pattern and the period of the second pattern is 20 ms, $\mu_{ref} = 0$.

16. A non-transitory computer readable storage medium, configured to store a computer program, wherein the computer program enables a computer to execute a method for determining a time domain resource, comprising:

determining a first slot set in a first period according to a first time division duplexing (TDD) configuration in radio resource control (RRC) signaling or a second TDD configuration in a physical sidelink broadcast channel (PSBCH); and selecting a part of slots from the first slot set according to a first bitmap, wherein the part of slots forms a time domain resource of a resource pool;

wherein the method further comprises:

determining, by the terminal device, a resource reservation interval based on a number of slots available for sidelink communication in a statistical period in the following mode:

where $P_{rsvp\_TX}'$ represents the resource reservation interval in slots, $P_{rsvp\_TX}$ represents an absolute resource reservation period in milliseconds, T represents the statistical period, and $P_{step}$ represents the number of slots available for sidelink communication in the statistical period.

* * * * *